United States Patent

Nakagawa

[11] Patent Number: 6,018,945
[45] Date of Patent: Feb. 1, 2000

[54] AIR-FUEL RATIO CONTROL DEVICE FOR ENGINE

[75] Inventor: Norihisa Nakagawa, Numazu, Japan

[73] Assignee: Toyota Jidosha Kabushiki Kaisha, Aichi, Japan

[21] Appl. No.: 09/075,515

[22] Filed: May 8, 1998

[30] Foreign Application Priority Data

May 9, 1997 [JP] Japan .................................... 9-119786

[51] Int. Cl.[7] .................................................... F01N 3/00
[52] U.S. Cl. .............................. 60/285; 60/286; 60/276; 123/691
[58] Field of Search ............................ 60/285, 276, 277, 60/286; 123/691, 703

[56] References Cited

U.S. PATENT DOCUMENTS

| | | | |
|---|---|---|---|
| 5,115,639 | 5/1992 | Gopp ......................................... | 60/274 |
| 5,319,921 | 6/1994 | Gopp ......................................... | 60/274 |
| 5,363,647 | 11/1994 | Ohuchi et al. ............................. | 60/276 |
| 5,797,261 | 8/1998 | Akazaki et al. ........................... | 60/276 |
| 5,878,733 | 3/1999 | Kato et al. ................................ | 123/681 |

OTHER PUBLICATIONS

Japanese Publication No. 7–197837, Aug. 1, 1995.
Japanese Publication No. 2–67433, Mar. 7, 1990.
Japanese Publication No. 9–119309, May 6, 1997.
Japanese Publication No. 9–88676, Mar. 31, 1997.

*Primary Examiner*—Thomas Denion
*Assistant Examiner*—Binh Tran
*Attorney, Agent, or Firm*—Kenyon & Kenyon

[57] ABSTRACT

An air-fuel ratio control device for an engine comprises a three way catalyst arranged in the exhaust passage, an upstream-side air-fuel ratio sensor arranged in the exhaust passage upstream of the three way catalyst, and an downstream-side air-fuel ratio sensor arranged in the exhaust passage downstream of the three way catalyst. A first feedback correction coefficient is calculated on the basis of an output of the upstream-side sensor to make the air-fuel ratio equal to the stoichiometric air-fuel ratio. A smoothed value is calculated on the basis of an output of the downstream-side sensor, the absolute value of a changing rate of the smoothed value being smaller than the absolute value of the changing rate of the output of the downstream-side sensor. A second feedback correction coefficient is calculated on the basis of a deviation of the output of the downstream-side sensor from the smoothed value. The first feedback correction coefficient is corrected using the second feedback correction coefficient. An amount of fuel to be fed to the engine is corrected using the corrected first feedback correction coefficient.

16 Claims, 8 Drawing Sheets

AIR-FUEL RATIO CONTROL DEVICE FOR ENGINE

BACKGROUND OF THE INVENTION

1. Field of the Invention

The present invention relates to an air-fuel ratio control device for an engine.

2. Description of the Related Art

Japanese Unexamined Patent Publication No. 7-197837 discloses an air-fuel ratio control device, for an engine, which is provided with a three way catalyst arranged in an exhaust passage of the engine, an upstream-side of air-fuel ratio sensor arranged in the exhaust passage upstream of the three way catalyst, and an downstream-side air-fuel ratio sensor arranged in the exhaust passage downstream of the three way catalyst. In the device, a parameter for controlling the air-fuel ratio is calculated on the basis of the output of the upstream-side sensor, the parameter is corrected by a correction coefficient which is calculated on the basis of the output of the downstream-side sensor, and the air-fuel ratio is controlled to be a target air-fuel ratio using the corrected parameter. The correction coefficient is calculated by PID control, i.e., on the basis of a deviation between the output of the downstream-side sensor and the value corresponding to the target air-fuel ratio (the proportional term), an integral value of the deviation (the integral term), and a differential value of the deviation (the differential term).

When the target air-fuel ratio is the stoichiometric air-fuel ratio, a Z-output type oxygen concentration sensor, of which the output changes stepwise around the stoichiometric air-fuel ratio, is used as the downstream-side sensor. However, an air-fuel ratio region where the output of the downstream-side sensor corresponds, one to one, to the air-fuel ratio, is a very narrow region which is around the stoichiometric air-fuel ratio. Further, in this air-fuel ratio region, even when the air-fuel ratio changes slightly, the output of the downstream-side sensor changes widely. Thus, the differential term will be unstable. Accordingly, in this case, the air-fuel ratio can be controlled accurately if the differential term is not used, i.e., if the air-fuel ratio is not controlled by the change in the output of the downstream-side sensor with time.

On the other hand, the three way catalyst has an oxygen storage capacity, and thus the change in the air-fuel ratio downstream of the three way catalyst is more moderate than that upstream of the three way catalyst. Therefore, when the output of the downstream-side sensor changes suddenly toward, for example, the lean side, it is found that the air-fuel ratio upstream of the three way catalyst changes very suddenly toward the lean side. However, if the air-fuel ratio changes very suddenly toward the lean side, the $NO_x$ purification ratio of the three way catalyst may deteriorate, and thus a large amount of $NO_x$ may be discharged from the three way catalyst. Also, if the output of the downstream-side sensor changes suddenly toward the rich side, a large amount of HC or CO may be discharged from the three way catalyst. Note that, in this case, the amount of $NO_x$, HC, or CO discharged from the three way catalyst becomes larger, as the changing rate of the output of the downstream-side sensor becomes larger. Accordingly, the air-fuel ratio is needed to be controlled on the basis of the change in the output of the downstream-side sensor with time, to purify the exhaust gas in the three way catalyst sufficiently. The publication mentioned above does not suggest the problem.

SUMMARY OF THE INVENTION

An object of the present invention is to provide an air-fuel control device for an engine capable of preventing the air-fuel ratio from changing suddenly, to thereby purify the exhaust gas in the three way catalyst sufficiently.

According to the present invention, there is provided an air-fuel control device, for an engine having an exhaust passage, comprising: a three way catalyst arranged in the exhaust passage; an upstream-side air-fuel ratio sensor arranged in the exhaust passage upstream of the three way catalyst; a downstream-side air-fuel ratio sensor arranged in the exhaust passage downstream of the three way catalyst; parameter calculating means for calculating a parameter for controlling the air-fuel ratio on the basis of an output of the upstream-side sensor; basic value calculating means for calculating a basic value on the basis of an output of the downstream-side sensor, the absolute value of a changing rate of the basic value being smaller than the absolute value of the changing rate of the output of the downstream-side sensor; first correcting means for correcting the parameter on the basis of a deviation of the output of the downstream-side sensor from the basic value; and air-fuel ratio controlling means for controlling the air-fuel ratio using the corrected parameter to make the air-fuel ratio equal to a target air-fuel ratio.

The present invention may be more fully understood from the description of the preferred embodiments of the invention as set forth below, together with the accompanying drawings.

DESCRIPTION OF THE PREFERRED EMBODIMENTS

Figure 1:
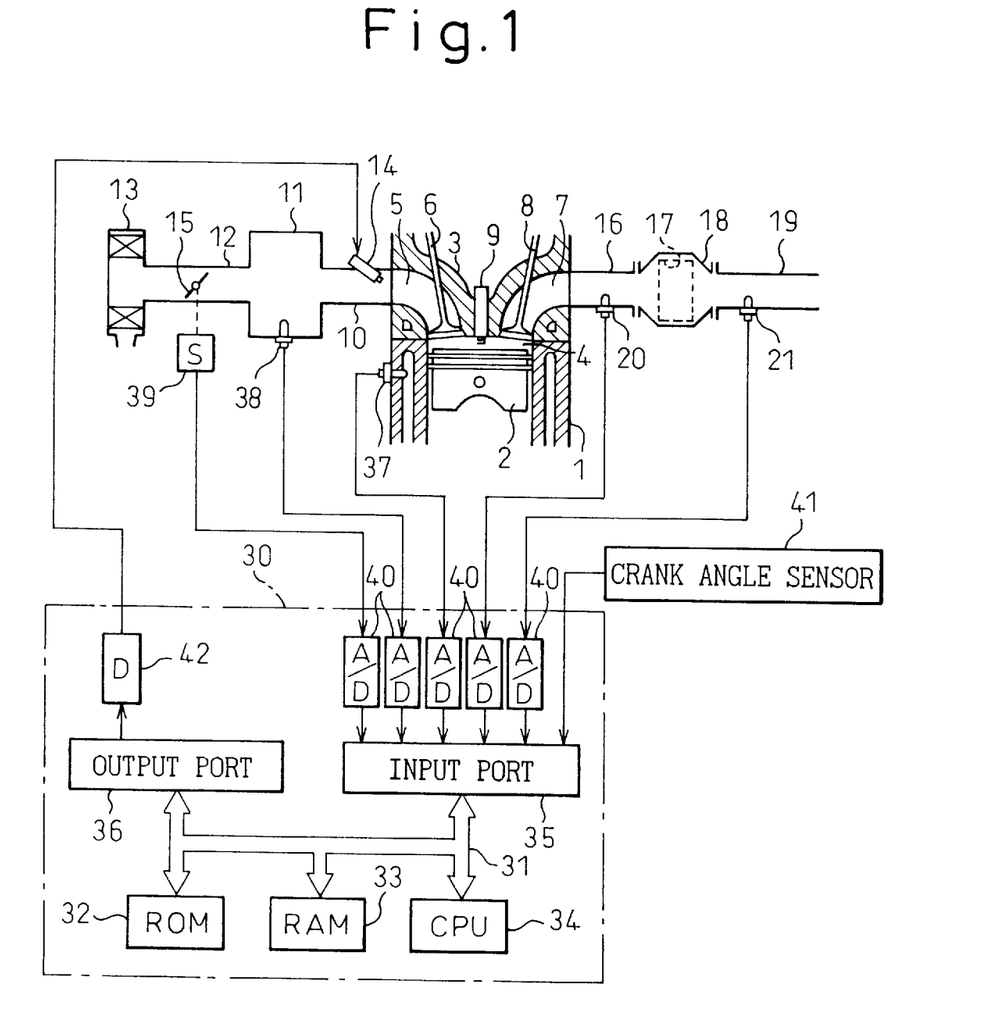
FIG. 1 is a general view of an engine.

Referring to FIG. 1, a reference numeral 1 designates a cylinder block, 2 designates a piston, 3 designates a cylinder head, 4 designates a combustion chamber, 5 designates an intake port, 6 designates an intake valve, 7 designates an exhaust port, 8 designates an exhaust valve, and 9 designates a spark plug. The intake ports 5 of each cylinder are connected to a common surge tank 11 via a corresponding branch 10, and the surge tank 11 is connected to an air cleaner 13 via an intake duct 12. A fuel injector 14 is arranged in each branch 10 to inject fuel into the corresponding branch 10, and a throttle valve 15 is arranged in the intake duct 12. On the other hand, the exhaust ports 7 of each cylinder are connected to a catalytic converter 18 housing a three way catalyst 17 therein, via a common exhaust manifold 16. The converter 18 is connected to a muffler (not shown) via an exhaust pipe 19. The fuel injectors 14 are controlled by output signals from an electronic control unit 30.

Figure 2A:
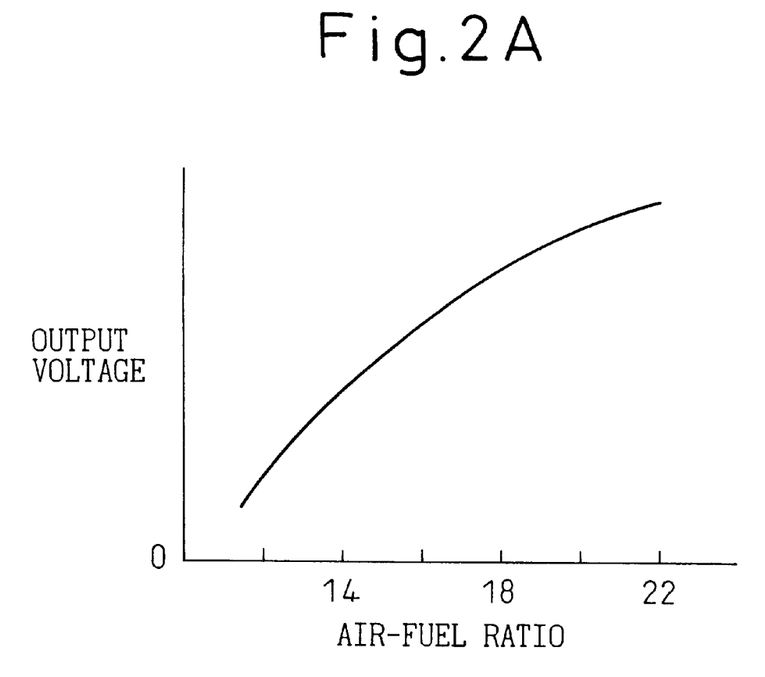
FIG. 2A is a diagram illustrating the characteristic of the upstream-side air-fuel ratio sensor.

An upstream-side air-fuel ratio sensor 20 is arranged in the exhaust manifold 16, i.e., in the exhaust passage upstream of the three way catalyst 17, and a downstream-side air-fuel ratio sensor 21 is arranged in the exhaust pipe 19, i.e., in the exhaust passage downstream of the three way catalyst 17. The upstream-side sensor 20 is formed by an air-fuel ratio sensor which generates an output voltage corresponding, one to one, to the air-fuel ratio over the whole air-fuel ratio region. Namely, the upstream-side sensor 20 is formed by a so-called overall air-fuel ratio sensor. The output voltage of the upstream-side sensor 20 is shown in FIG. 2A. As shown in FIG. 2A, the output voltage of the upstream-side sensor 20 changes continuously with a change in the air-fuel ratio.

Figure 2B:
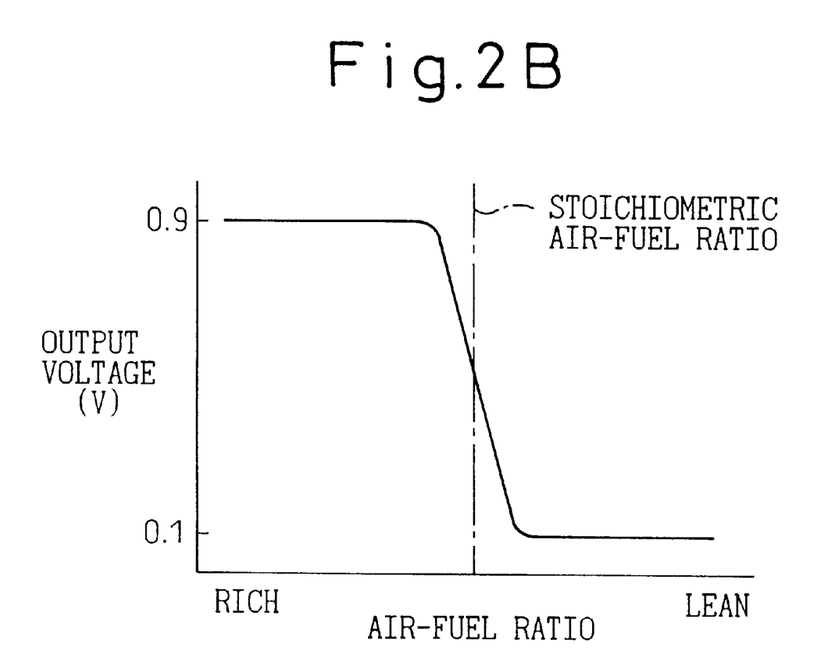
FIG. 2B is a diagram illustrating the characteristic of the downstream-side air-fuel ratio sensor.

While a target air-fuel ratio can be set to any air-fuel ratio, the target air-fuel ratio in the engine shown in FIG. 1 is set to the stoichiometric air-fuel ratio. In a case where the target air-fuel ratio is set to the stoichiometric air-fuel ratio, the downstream-side sensor 21 is formed by an oxygen concentration sensor, of which an output voltage changes stepwise around the stoichiometric air-fuel ratio in accordance with the oxygen concentration in the exhaust gas. Namely, the downstream-side sensor 21 is formed by a so-called Z-output type oxygen concentration sensor. The downstream-side sensor 21 generates the output voltage of about 0.9 V when the air-fuel ratio is rich, and generates the output voltage of about 0.1 V when the air-fuel ratio is lean, as shown in FIG. 2B.

Referring to FIG. 1 again, the electronic control unit (ECU) 30 is constructed as a digital computer and comprises a read-only memory (ROM) 32, a random-access memory (RAM) 33, the CPU (micro processor) 34, an input port 35, and an output port 36, which are interconnected with each other via a bidirectional bus 31. A temperature sensor 37 is attached to the cylinder block 1, and generates an output voltage in proportion to the temperature of the cooling water of the engine. A pressure sensor 38 is attached to the surge tank 11, and generates an output voltage in proportion to the amount of the intake air. A throttle opening sensor 39 is attached to the throttle valve 15, and generates an output voltage in proportion to a degree of opening of the throttle valve 15. The output voltages of the temperature sensor 37, the pressure sensor 38, the throttle opening sensor 39, the upstream-side sensor 20, and the downstream-side sensor 21 are input to the input port 35 via corresponding AD converters 40, respectively. The input port 35 is also connected to a crank angle sensor 41, which generates a pulse whenever a crankshaft is turned by, for example, 30 degrees. According to these pulses, the CPU 34 calculates the engine speed N. The output port 36 is connected to the fuel injectors 14 via corresponding drive circuits 42, respectively.

Next, a method for controlling the air-fuel ratio in the engine shown in FIG. 1 will be explained.

In the engine shown in FIG. 1, an amount of fuel to be injected QF is calculated on the basis of the following equation:

$$QF = QFTGT \cdot C1 + FBM + C2$$

where QFTGT and FBM represent a target amount of fuel to be injected and a first feedback correction coefficient, respectively, and C1 and C2 represent correction coefficients defined on the basis of the engine operating condition. Note that C1 may be defined on the basis of the temperature of the engine cooling water, and C2 may be defined taking the amount of fuel adhered to the wall of the intake passage into consideration.

The target fuel injection amount QFTGT is an amount of fuel required to make the air-fuel ratio of the air-fuel mixture fed to the combustion chamber 4 equal to the stoichiometric air-fuel ratio, and is calculated on the basis of the following equation:

$$QFTGT = QA/AFS$$

where QA and AFS represent the actual intake air amount and the stoichiometric air-fuel ratio, respectively. The intake air amount QA is estimated on the basis of the negative pressure in the surge tank 11, the engine speed N, and the degree of throttle opening ODT. Note that the estimation of the intake air amount QA on the basis of the degree of throttle opening ODT, as in the present embodiment, provides an accurate estimation of the intake air amount.

The first feedback correction coefficient FBM is for making the amount of fuel actually fed to the combustion chamber 4 equal to the target fuel injection amount QFTGT, on the basis of the output of the upstream-side sensor 20, and is calculated on the basis of the following equation:

$$FBM = KMP \cdot FBMP + KMI \cdot FBMI$$

where FBMP, FBMI, KMP, and KMI represent a deviation of the amount of fuel actually fed to the combustion chamber 4 from the target fuel injection amount QFTGT, an integrated value of the deviation FBMP, a proportional gain, and an integral gain, respectively. If the air-fuel ratio of the air-fuel mixture actually fed to the combustion chamber 4 is represented by AFACT, the amount of fuel actually fed to the combustion chamber 4 is represented by QA/AFACT. Thus, the deviation FBMP is represented by QA/AFACT−QFTGT.

The actual air-fuel ratio AFACT is obtained on the basis of VUC, which is defined in accordance with the output voltage VU of the upstream-side sensor 20, using the map shown in FIG. 2A. VUC is calculated on the basis of the following equation:

$$VUC = VU + FBS$$

where FBS represents a second feedback correction coefficient, which is calculated on the basis of the output voltage of the downstream-side sensor 21. The second feedback correction coefficient FBS is for making the output voltage VD of the downstream-side sensor 21 equal to a reference voltage VDREF corresponding to the stoichiometric air-fuel ratio, and is calculated on the basis of the following equation:

$$FBS = KSP \cdot FBSP + KSI \cdot FBSI + KSR \cdot FBSR$$

where FBSP, FBSI, FBSR, KSP, KSI, and KSR represent a deviation of the output voltage VD of the downstream-side sensor 21 from the reference voltage VDREF, an integrated value of FBSP, a deviation of the output voltage VD from a basic voltage (explained hereinafter), a proportional gain, an integral gain, and a gain of the deviation FBSR, respectively. Note that the reference voltage VDREF is about 0.45 V, for example.

As mentioned at the beginning, if the output voltage VD of the downstream-side sensor 21 changes suddenly toward, for example, the lean side, a large amount of $NO_x$ may be discharged from the three way catalyst 17. In this case, if the second feedback correction coefficient FBS is obtained by the proportional and integral terms, i.e., by KSP·FBSP+ KSI·FBSI, it may be impossible to compensate for the sudden change in the output voltage VD of the downstream-side sensor 21 sufficiently.

Thus, in the present embodiment, first, the basic voltage is calculated. The basic voltage changes with a changing rate which is smaller than the changing rate of the output voltage VD of the downstream-side sensor 21. When the output voltage VD changes toward the lean side, i.e., when the output voltage VD is lowered, the second feedback correction coefficient FBS is calculated on the basis of the deviation FBSR of the output voltage VD from the basis voltage. This controls the air-fuel ratio so that the output voltage VD changes toward the basic voltage. As a result, the output voltage VD is prevented from lowering suddenly. Further, as the lowering rate of the output voltage VD becomes larger, the deviation FBSR becomes larger and thus the correction amount becomes larger. Therefore, it is possible to quickly compensate for the sudden lowering of the output voltage VD. Accordingly, a large amount of $NO_x$ is prevented from being discharged from the three way catalyst 17. Note that, in the present embodiment, the correction on the basis of the deviation FBSR is stopped when the output voltage VD of the downstream-side sensor 21 becomes larger than the basic voltage.

The basic voltage may be set to any voltage, provided that the absolute value of the changing rate of the basic voltage is smaller than that of the output voltage VD of the downstream-side sensor 21. In the present embodiment, the basic voltage is set to a smoothed value VDSM, which is obtained by smoothing the output voltage VD.

Figure 3:
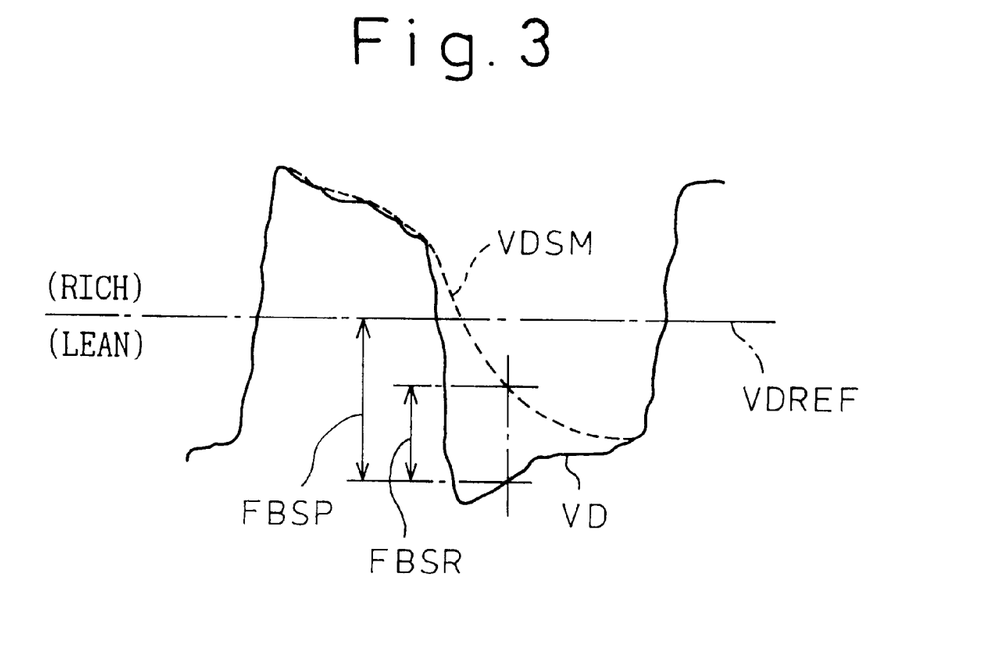
FIG. 3 shows a timechart illustrating the relationships between the output voltage of the downstream-side sensor and the smoothed value.

FIG. 3 illustrates the relationship between the output voltage VD of the downstream-side sensor 21 and the smoothed value VDSM. As shown in FIG. 3, when the output voltage VD lowers suddenly, the output voltage VD deviates from the smoothed value VDSM by the deviation FBSR. The second feedback correction coefficient FBS is calculated on the basis of the deviation FBSR.

Figure 4:
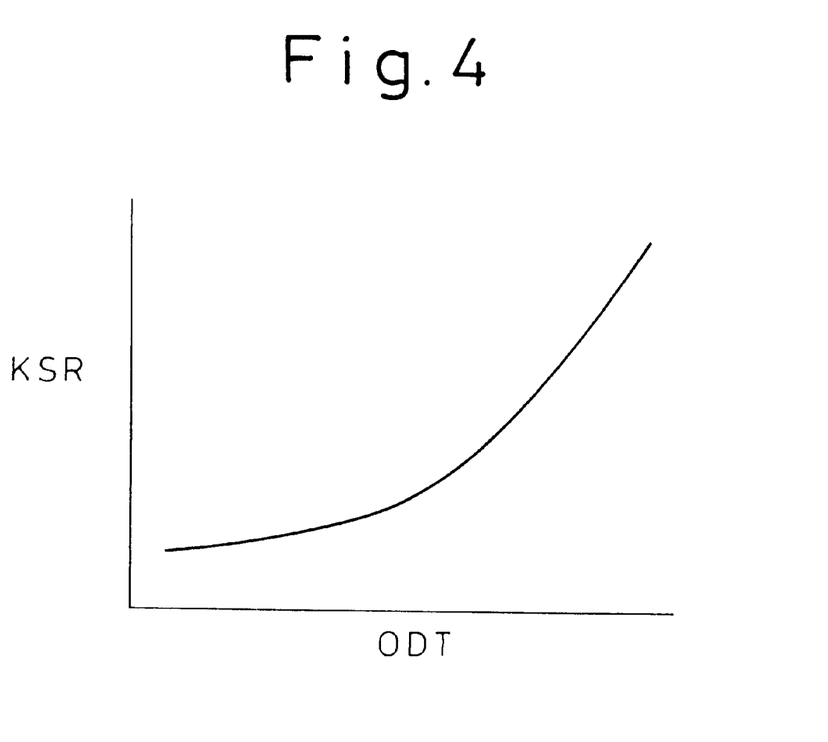
FIG. 4 is a diagram illustrating a gain KSR for the deviation FBSR.

On the other hand, the gain KSR of the deviation FBSR may be set to any gain. However, the amount of $NO_x$ discharged from the engine per unit time becomes larger, as the engine load becomes larger. Namely, the correction amount must become larger, as the engine load becomes larger. Thus, in the present embodiment, the gain KSR is set to become larger as the degree of throttle opening ODT, which represents the engine load, becomes larger, as shown in FIG. 4.

Figure 5:
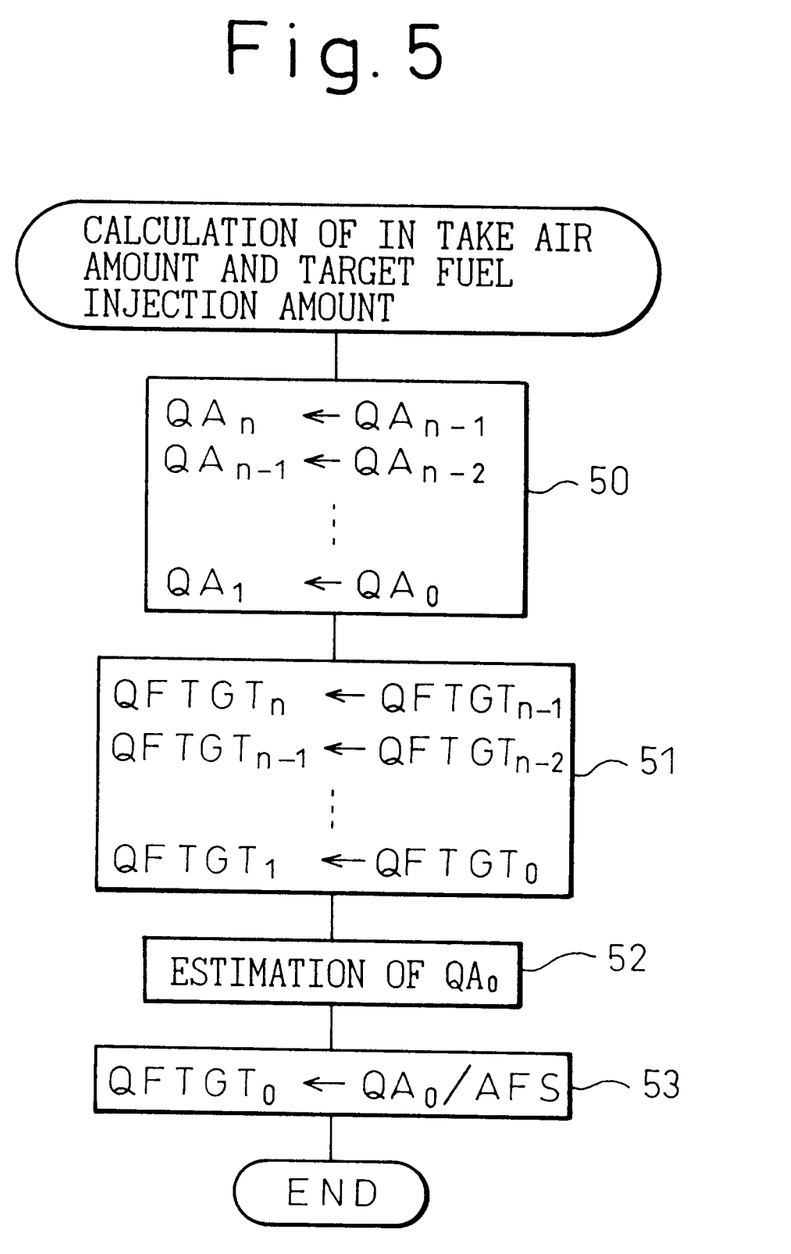
FIG. 5 shows a flowchart for calculating the intake air amount and the target fuel injection amount.

FIG. 5 shows a calculation routine of the intake air amount and the fuel injection amount. The routine is executed by interruption every predetermined crank angle.

Referring to FIG. 5, first, in step 50, the actual intake air amount $QA_i$ is renewed. Namely, in the general expression, the intake air amount $QA_i$ which is calculated in the processing cycle "i" times before is made $QA_{i+1}$ (i=1, 2, ... n). In the following step 51, the target fuel injection amount $QFTGT_i$ is renewed. Namely, in the general expression, the target fuel injection amount $QFTGT_i$ which is calculated in the processing cycle "i" times before is made $QFTGT_{i+1}$. As mentioned above, in the present embodiment, the amount of fuel actually fed to the combustion chamber 4 (QA/AFACT) is calculated on the basis of the intake air amount and the air-fuel ratio. The intake air amount is estimated when the gas (the intake air or the air-fuel mixture) is flowing through the intake passage, and the air-fuel ratio is detected when the gas (the exhaust gas) is flowing through the exhaust passage.

Thus, it takes a certain time from the time the amount of the gas is estimated until the gas reaches the upstream-side sensor 20. Accordingly, to obtain the amount of fuel actually fed to the combustion chamber 4 accurately, the intake air amount must be estimated the above-mentioned certain time before the upstream-side sensor 20 detects the air-fuel ratio. Thus, in the present embodiment, the number "n" corresponding to the above-mentioned certain time is introduced, and the amount of fuel actually fed to the combustion chamber is calculated on the basis of the air-fuel ratio detected in the present processing cycle, and the intake air amount estimated in the processing cycle "n" times before, as in step 64 shown in FIG. 6. To this end, the intake air amount and the target fuel injection amounts obtained in the last "n" times processing cycles, in the form of $QA_i$ and $QFTGT_i$, respectively, are stored in the RAM 33.

In the following step 52, the intake air amount in the present processing cycle $QA_0$ is estimated on the basis of the negative pressure in the surge tank 11, the engine speed N, and the degree of throttle opening ODT. In the following step 53, the target fuel injection amount in the present processing cycle $QFTGT_0$ is calculated using the intake air amount in the present processing cycle $QA_0$ and the stoichiometric air-fuel ratio AFS ($QFTGT_0=QA_0/AFS$).

Figure 6:
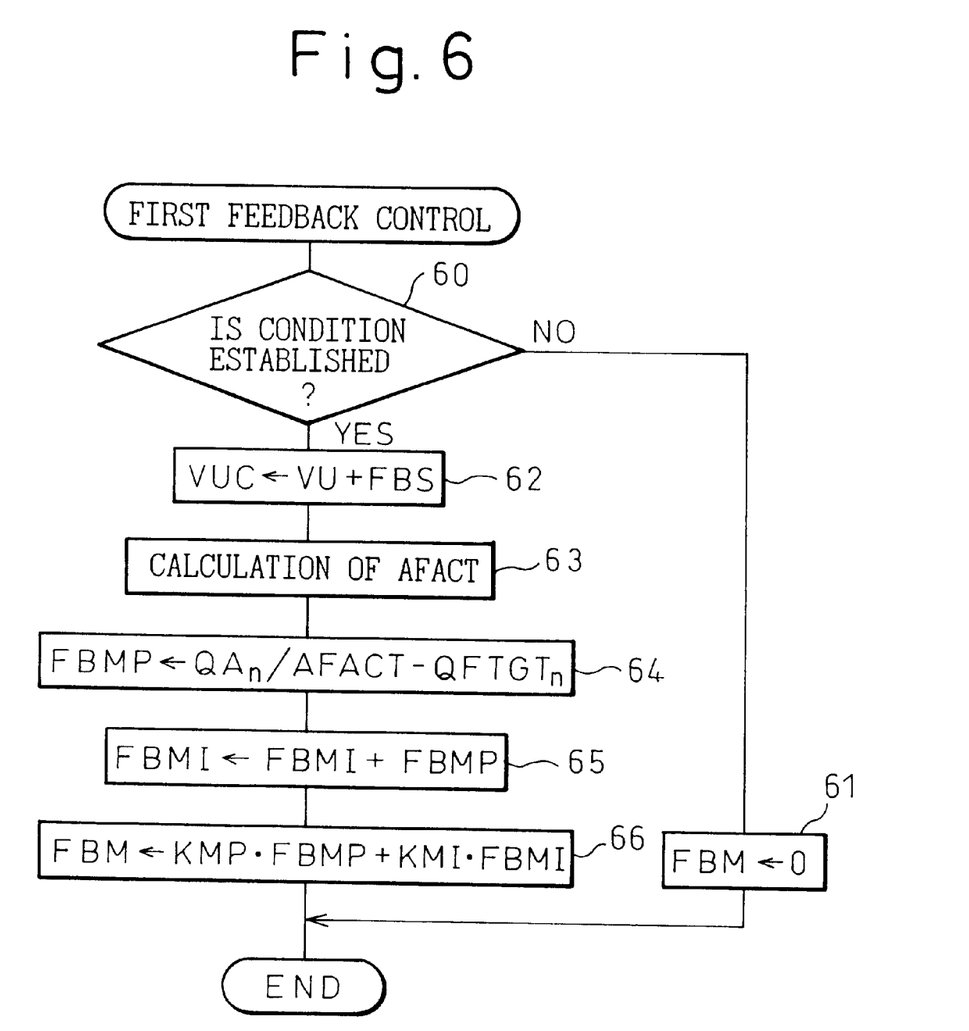
FIG. 6 shows a flowchart for executing the first feedback control.

FIG. 6 shows a routine for executing a first feedback control, which is carried out on the basis of the output of the upstream-side sensor 20. The routine is executed by interruption every predetermined crank angle, which is same as that in the routine shown in FIG. 5.

Referring to FIG. 6, first, in step 60, it is judged whether a condition for executing the first feedback control is established. In the present embodiment, the condition is judged to be established when the upstream-side sensor 20 is activated, and the warming-up is finished, and a predetermined time has passed since the increasing control of the fuel injection amount or the stop of the fuel injection is finished. When the condition is judged not to be established, the routine goes to step 61, where the first feedback correction coefficient FBM is made zero, and then the processing cycle is ended. Namely, in this case, the correction by the first feedback correction coefficient FBM is not executed.

Figure 7:
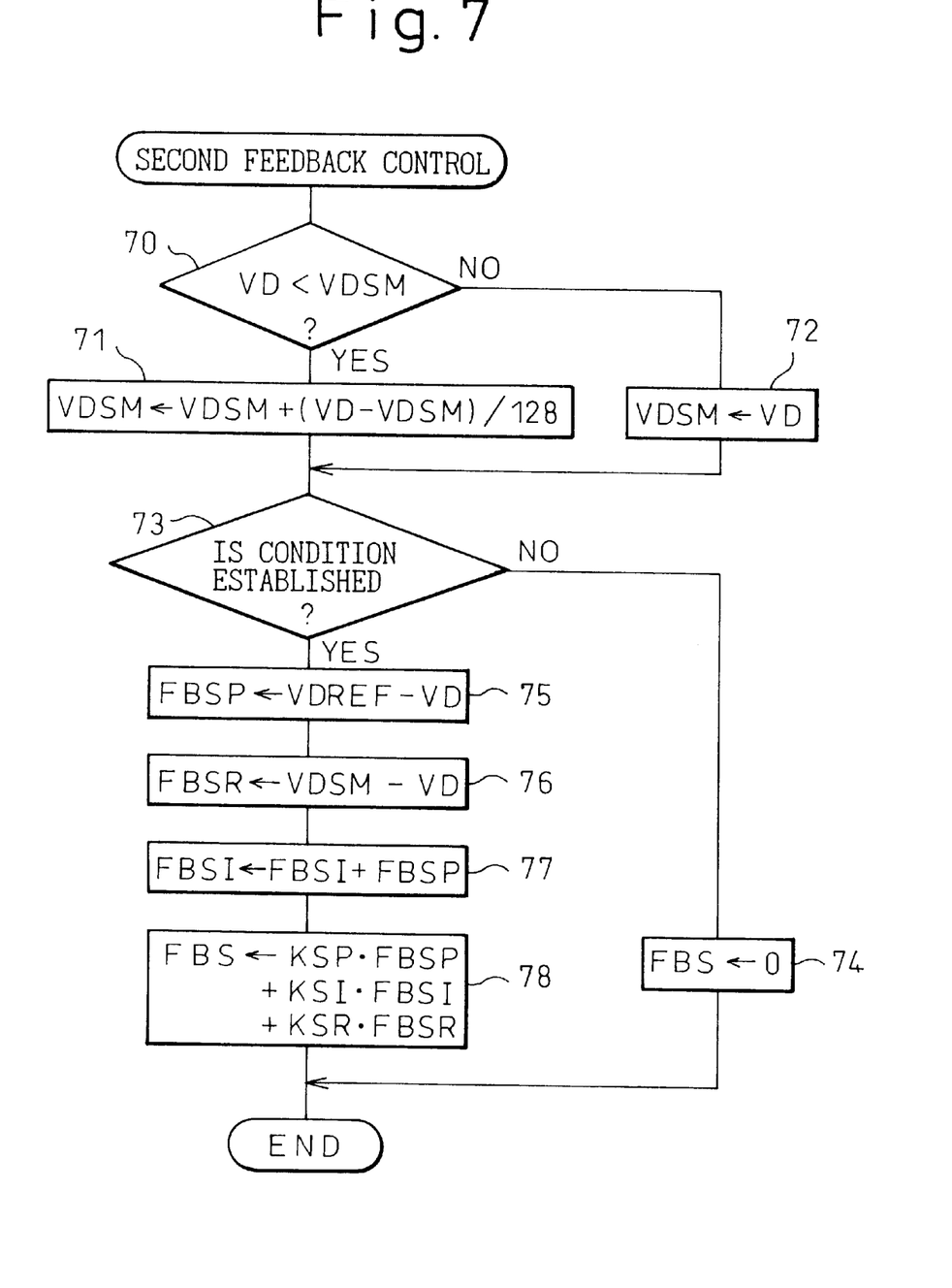
FIG. 7 shows a flowchart for executing the second feedback control.

Contrarily, when the condition is judged to be established, the routine goes to step 62, where VUC is calculated by adding the second feedback correction coefficient FBS, which is calculated in the routine shown in FIG. 7, to the output voltage VU of the upstream-side sensor 20. In the following step 63, the air-fuel ratio AFACT corresponding to VUC is calculated using the map shown in FIG. 2A. In the following step 64, the deviation FBMP is calculated using the intake air amount $QA_n$ and the target fuel injection amount $QFTGT_n$, which are calculated in the processing cycle "n" times before, and the air-fuel ratio AFACT, which is calculated in the step 63, on the basis of the following equation:

$$FBMP=QA_n/AFACT-QFTGT_n$$

In the following step 65, the integrated value FBMI is calculated (FBMI=FBMI+FBMP). In the following step 66, the first feedback correction coefficient FBM is calculated on the basis of the following equation:

$$FBM=KMP·FBMP+KMI·FBMI$$

FIG. 7 shows a routine for executing a second feedback control, which is carried out on the basis of the output of the downstream-side sensor 21. The routine is executed by interruption every predetermined time.

Referring to FIG. 7, first, in step 70, it is judged whether the output voltage VD of the downstream-side sensor 21 is smaller than the smoothed value VDSM. If VD<VDSM, the routine goes to step 71, where the smoothed value VDSM is calculated on the basis of the following equation:

$$VDSM=VDSM+(VD-VDSM)/128$$

Then, the routine goes to step 73. Contrarily, if VD≧VDSM, the routine goes to step 72, where VDSM is made VD. Then, the routine goes to step 73.

In step 73, it is judged whether a condition for executing the second feedback control is established. In the present embodiment, the condition is judged to be established when the downstream-side sensor 21 is activated, and the warming-up is finished, and a predetermined time has passed since the increasing control of the fuel injection amount or the stop of the fuel injection is finished, and the first feedback correction control is in process. When the condition is judged not to be established, the routine goes to step 74, where the second feedback correction coefficient FBS is made zero, and then the processing cycle is ended. Namely, in this case, the correction on the basis of the second feedback correction coefficient FBS is not executed.

Contrarily, when the condition is judged to be established, the routine goes from step 73 to step 75, where the deviation FBSP is calculated (FBSP=VDREF−VD). In the following step 76, the deviation FBSR is calculated (FBSR=VDSM−VD). If VDSM is made VD in step 72, the deviation FBSR is made zero, and the correction on the basis of the FBSR is not executed.

In the following step 77, the integrated value FBSI is calculated (FBSI=FBSI+FBSP). In the following step 78, the second feedback correction coefficient FBS is calculated on the basis of the following equation:

$$FBS=KSP\cdot FBSP+KSI\cdot FBSI+KSR\cdot FBSR$$

Figure 8:
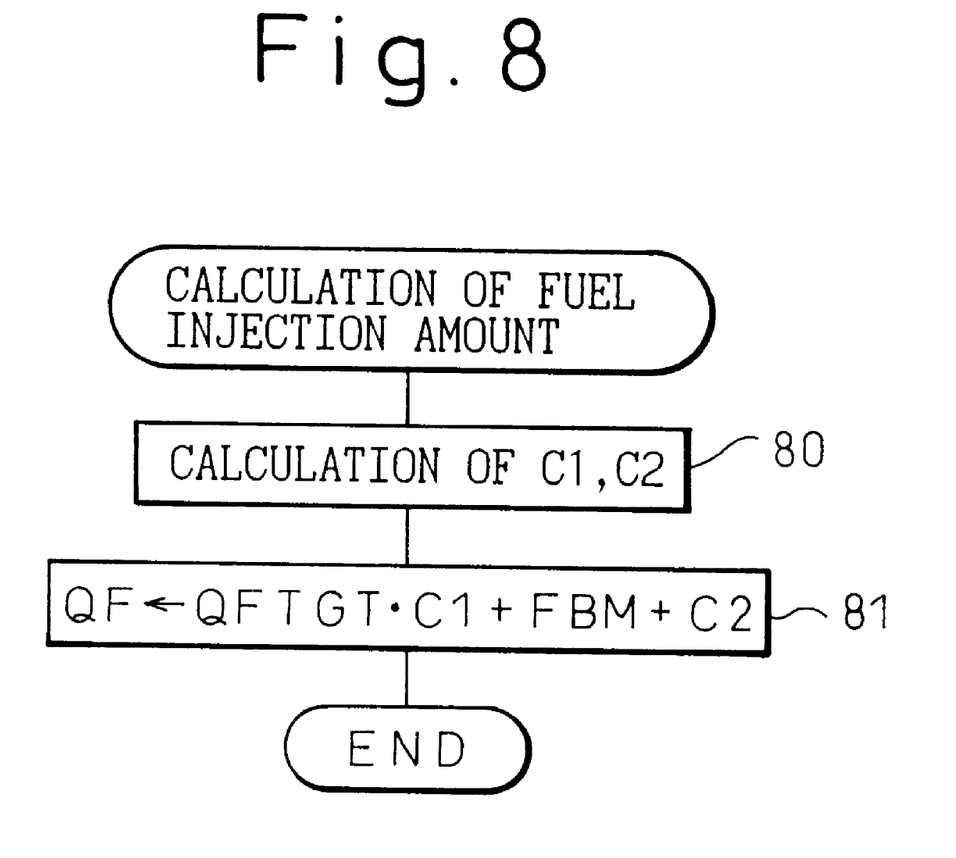
FIG. 8 shows a flowchart for calculating the fuel injection amount.

FIG. 8 shows a routine for calculating the fuel injection amount QF. The routine is executed by interruption every predetermined crank angle.

Referring to FIG. 8, first, in step 80, the correction coefficients C1 and C2 are calculated. In the following step 81, the fuel injection amount QF is calculated on the basis of the following equation:

$$QF=QFTGT\cdot C1+FBM+C2$$

The fuel injector 14 injects fuel for a period corresponding to the amount QF.

Figure 9:
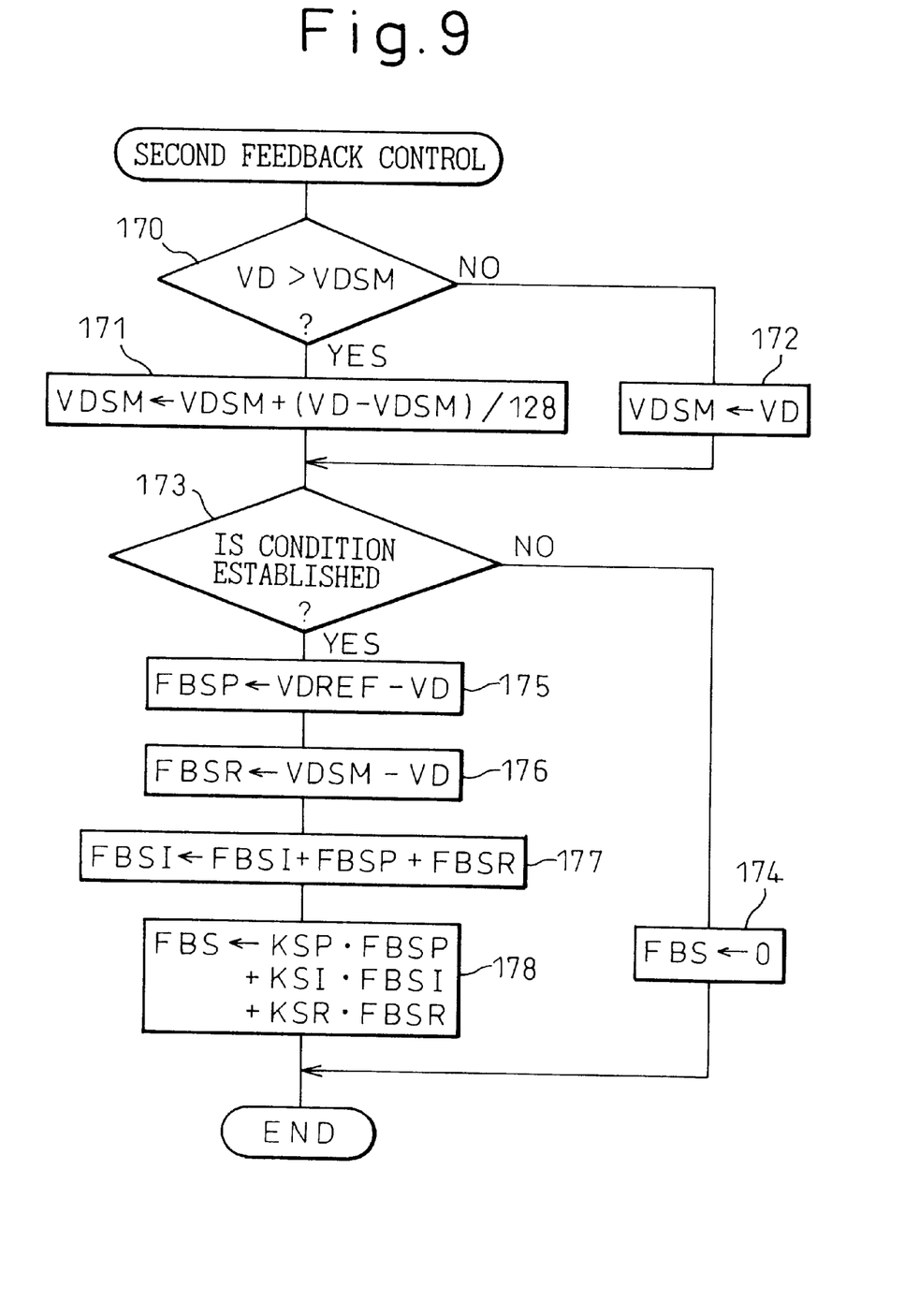
FIG. 9 shows a flowchart for executing the second feedback control according to another embodiment of the present invention.

FIG. 9 illustrates another embodiment.

As mentioned at the beginning, when the output voltage VD of the downstream-side sensor 21 suddenly changes toward the rich side, a large amount of HC, CO may be discharged from the three way catalyst 17. Thus, in the present embodiment, when the output voltage VD changes toward the rich side, i.e., when the output voltage VD increases, the second feedback correction coefficient FBS is calculated on the basis of the deviation FBSR of the output voltage VD from the smoothed value VDSM. As a result, the output voltage VD is prevented from increasing suddenly, and thus a large amount of HC, CO is prevented from being discharged from the three way catalyst 17.

In a case where the second feedback correction coefficient FBS is calculated on the basis of the deviation FBSR in this way, the increasing rate of the output voltage VD is suppressed when the output voltage VD is corrected to increase toward the reference voltage VDREF from a relatively small voltage, and this is undesirable. Thus, in the present embodiment, the integrated value FBSI is calculated as an integrated value of the deviations FBSP and FBSR, to thereby suppress the correction by the deviation FBSR.

FIG. 9 shows a routine for executing a second feedback control according to the present embodiment. The routine shown in FIG. 9 is substantially same as the routine shown in FIG. 7 in the point that steps 171 to 176 and 178 in FIG. 9 are same as steps 71 to 76 and 78 in FIG. 7, respectively, and is different from the routine shown in FIG. 7 in steps 170 and 177.

Namely, referring to FIG. 9, first, in step 170, it is judged whether the output voltage VD of the downstream-side sensor 21 is larger than the smoothed value VDSM. If VD>VDSM, the routine goes to step 171, where the smoothed value VDSM is calculated (VDSM=VDSM+(VD−VDSM)/128). Then, the routine goes to step 173. Contrarily, if VD≦VDSM, the routine goes to step 172, where VDSM is made VD. Then, the routine goes to step 173. In step 173, it is judged whether the condition for executing the second feedback control is established. When the condition is judged not to be established, the routine goes to step 174, where the second feedback correction coefficient FBS is made zero. Contrarily, when the condition is judged to be established, the routine goes from step 173 to step 175, where the deviation FBSP is calculated (FBSP=VDREF−VD). In the following step 176, the deviation FBSR is calculated (FBSR=VDSM−VD). In the following step 177, the integrated value FBSI is calculated (FBSI=FBSI+FBSP+FBSR). In the following step 178, the second feedback correction coefficient FBS is calculated on the basis of the following equation:

$$FBS=KSP\cdot FBSP+KSI\cdot FBSI+KSR\cdot FBSR$$

Note that, in the present embodiment, the routines shown in FIGS. 5, 6, and 8 are also executed. The other structure and operation of the air-fuel ratio control device of the present embodiment are same as those of the above-mentioned embodiment, and thus the explanations thereof are omitted.

In the above-mentioned embodiments, the second feedback correction coefficient FBS is calculated on the basis of the deviation FBSR when the output voltage VD of the downstream-side sensor 21 lowers, i.e., when the output voltage VD is smaller than the smoothed value VDSM to thereby reduce the amount of $NO_x$ discharged from the three way catalyst 17, or when the output voltage VD increases, i.e., when the output voltage VD is larger than the smoothed value VDSM to thereby reduce the amount of HC, CO discharged from the three way catalyst 17. Alternatively, the deviation FBSR may be calculated regardless of whether the output voltage VD increases or lowers, i.e., regardless of whether the output voltage VD is larger or smaller than the smoothed value VDSM, and then the second feedback correction coefficient FBS may be calculated on the basis of the deviation FBSR. This can reduce both of the amount of $NO_x$ and the amount of HC, CO, discharged from the three way catalyst 17. Further, alternatively, the second feedback correction coefficient FBS may be calculated on the basis of the deviation FBSR when the absolute value of the changing rate of the output voltage VD is larger than a predetermined value.

According to the present invention, it is possible to provide an air-fuel control device for an engine capable of preventing the air-fuel ratio from changing suddenly, to thereby purify the exhaust gas in the three way catalyst sufficiently.

While the invention has been described by reference to specific embodiments chosen for purposes of illustration, it should be apparent that numerous modifications could be made thereto by those skilled in the art without departing from the basic concept and scope of the invention.

I claim:

1. An air-fuel ratio control device for an engine having an exhaust passage, comprising:
    a three way catalyst arranged in the exhaust passage;
    an upstream-side air-fuel ratio sensor arranged in the exhaust passage upstream of the three way catalyst;
    a downstream-side air-fuel ratio sensor arranged in the exhaust passage downstream of the three way catalyst;
    parameter calculating means for calculating a parameter for controlling an air-fuel ratio based on an output of the upstream-side sensor;
    basic value calculating means for calculating a basic value based on an output of the downstream-side sensor, an absolute value of a changing rate of the basic value being smaller than an absolute value of a changing rate of the output of the downstream-side sensor;
    first correcting means for correcting the parameter based on a deviation of the output of the downstream-side sensor from the basic value; and
    air-fuel controlling means for controlling the air-fuel ratio using the corrected parameter to make the air-fuel ratio equal to a target air-fuel ratio.

2. An air-fuel ratio control device according to claim 1, wherein the basic value is a mean value of the output of the downstream-side sensor.

3. An air-fuel ratio control device according to claim 1, wherein the target air-fuel ratio is the stoichiometric air-fuel ratio.

4. An air-fuel ratio control device according to claim 3, wherein the downstream-side sensor is formed by an oxygen concentration sensor, of which an output changes stepwise around the stoichiometric air-fuel ratio in accordance with the oxygen concentration in the exhaust gas.

5. An air-fuel ratio control device according to claim 1, wherein the correction amount of the first correcting means becomes larger as the engine load becomes larger.

6. An air-fuel ratio control device according to claim 1, wherein the correction by the first correcting means is executed when the output of the downstream-side sensor is smaller than the basic value, and is stopped when the output of the downstream-side sensor is larger than the basic value.

7. An air-fuel ratio control device according to claim 1, wherein the correction by the first correcting means is executed when the output of the downstream-side sensor is larger than the basic value, and is stopped when the output of the downstream-side sensor is smaller than the basic value.

8. An air-fuel ratio control device according to claim 1, further comprising a second correcting means for correcting the parameter on the basis of a deviation of the output of the downstream-side sensor from a reference value which corresponds to the target air-fuel ratio, to make the output of the downstream-side sensor equal to the reference value.

9. An air-fuel ratio control device according to claim 8, wherein the parameter is corrected on the basis of the deviation of the output of the downstream-side sensor from the reference value and an integrated value of the deviation of the output of the downstream-side sensor from the reference value, and not on the basis of the differential value of the deviation of the output of the downstream-side sensor from the reference value.

10. An air-fuel ratio control device according to claim 1, wherein the corrected parameter represents the actual air-fuel ratio.

11. An air-fuel ratio control device according to claim 10, further comprising fuel amount calculating means for calculating an amount of fuel to be fed to the engine, intake air amount calculating means for calculating an amount of intake air, actual fuel amount calculating means for calculating an amount of fuel actually fed to the engine on the basis of the actual air-fuel ratio and the intake air amount, and target fuel amount calculating means for calculating a target amount of fuel required to make the air-fuel ratio equal to the target air-fuel ratio, wherein the fuel amount is corrected on the basis of a deviation of the actual fuel amount from the target fuel amount to make the air-fuel ratio equal to the target air-fuel ratio.

12. An air-fuel ratio control device according to claim 11, wherein the actual fuel amount is calculated on the basis of the intake air amount calculated a predetermined time before the upstream-side sensor detects the air-fuel ratio, the predetermined time being a time required from the time the amount of the gas is calculated until the gas reaches the upstream-side sensor.

13. An air-fuel ratio control device according to claim 11, wherein the intake air amount calculating means comprises estimating means for estimating the intake air amount on the basis of the engine operating condition.

14. An air-fuel ratio control device according to claim 13, wherein the intake air amount is estimated on the basis of a degree of opening of a throttle valve of the engine.

15. An air-fuel ratio control device according to claim 11, wherein the target fuel amount is calculated on the basis of the intake air amount and the target air-fuel ratio.

16. An air-fuel ratio control device according to claim 1, wherein the upstream-side sensor is formed by an air-fuel ratio sensor, of which an output changes continuously with the change in the air-fuel ratio.

* * * * *

UNITED STATES PATENT AND TRADEMARK OFFICE
CERTIFICATE OF CORRECTION

PATENT NO. : 6,018,945
DATED : February 1, 2000
INVENTOR(S) : Norihisa NAKAGAWA

It is certified that error appears in the above-identified patent and that said Letters Patent is hereby corrected as shown below:

ABSTRACT, line 4, change "an" to --a--.

Column 1, line 13, change "an" to --a--.

Column 10, line 31, after "calculated" insert --at--.

Signed and Sealed this

Tenth Day of April, 2001

Attest:

NICHOLAS P. GODICI

Attesting Officer  Acting Director of the United States Patent and Trademark Office